US011589521B2

(12) United States Patent
Kolbet

(10) Patent No.: US 11,589,521 B2
(45) Date of Patent: Feb. 28, 2023

(54) SYSTEM AND METHOD FOR REMOVING BIOMASS FROM STEM

(71) Applicant: Safari Enterprises L.L.C., Idaho Falls, ID (US)

(72) Inventor: Karl N. Kolbet, Idaho Falls, ID (US)

(73) Assignee: Safari Enterprises L.L.C., Idaho Falls, ID (US)

( * ) Notice: Subject to any disclaimer, the term of this patent is extended or adjusted under 35 U.S.C. 154(b) by 477 days.

(21) Appl. No.: 16/824,909

(22) Filed: Mar. 20, 2020

(65) Prior Publication Data

US 2021/0291192 A1   Sep. 23, 2021

(51) Int. Cl.
| | | |
|---|---|---|
| *A23N 15/00* | (2006.01) | |
| *A01D 45/06* | (2006.01) | |
| *A01G 17/02* | (2006.01) | |
| *A01G 3/00* | (2006.01) | |
| *A24B 5/06* | (2006.01) | |

(52) U.S. Cl.
CPC ............ *A01G 17/02* (2013.01); *A01G 3/00* (2013.01); *A23N 15/00* (2013.01); *A01D 45/065* (2013.01); *A01G 2003/005* (2013.01); *A24B 5/06* (2013.01)

(58) Field of Classification Search
CPC ......... A23N 15/00; A01D 45/065; A24B 5/06
USPC ................................................ 198/813, 817
See application file for complete search history.

(56) References Cited

U.S. PATENT DOCUMENTS

| | | | | |
|---|---|---|---|---|
| 569,575 A | * | 10/1896 | Coffee ..................... | A24B 5/06 131/314 |
| 595,041 A | * | 12/1897 | Butler ..................... | A24B 5/06 131/321 |
| 1,650,521 A | * | 11/1927 | Johnson ................ | A01D 45/003 56/59 |
| 2,039,085 A | * | 4/1936 | Kinker, Jr. ................ | A24B 5/06 131/321 |
| 3,074,222 A | * | 1/1963 | Cunningham ......... | A01D 78/06 56/376 |
| 5,058,369 A | * | 10/1991 | Garner ................... | A01D 23/04 56/157 |
| 8,753,180 B2 | * | 6/2014 | Hutchins ................ | A01D 45/16 460/134 |
| 10,334,785 B2 | * | 7/2019 | Wieker ................ | A01D 45/065 |

FOREIGN PATENT DOCUMENTS

JP          2000004629 A   *  1/2000

* cited by examiner

*Primary Examiner* — Alicia Torres
(74) *Attorney, Agent, or Firm* — Hawley Troxell Ennis & Hawley LLP; Philip McKay; Rivkah Young

(57) ABSTRACT

A system for removing biomass from a stem includes a frame, a conveyor mechanism which moves the stem in a horizontal conveying direction, a pair of rollers which exert a rubbing force between each other for removing the biomass from the stem, and a tensioning system arranged to exert a force which holds the stem to the conveyor mechanism. A first axial end of each roller is connected to an inlet end side of the conveyor mechanism, and a second axial end of each roller is connected to a transmission such that the rollers are angled downward from the first axial ends to the second axial ends. The conveyor mechanism moves the stem so as to pass between the rollers such that the rubbing force removes the biomass from the stem, and such that the rubbing force moves downward along the stem as the stem moves in the conveying direction.

13 Claims, 12 Drawing Sheets

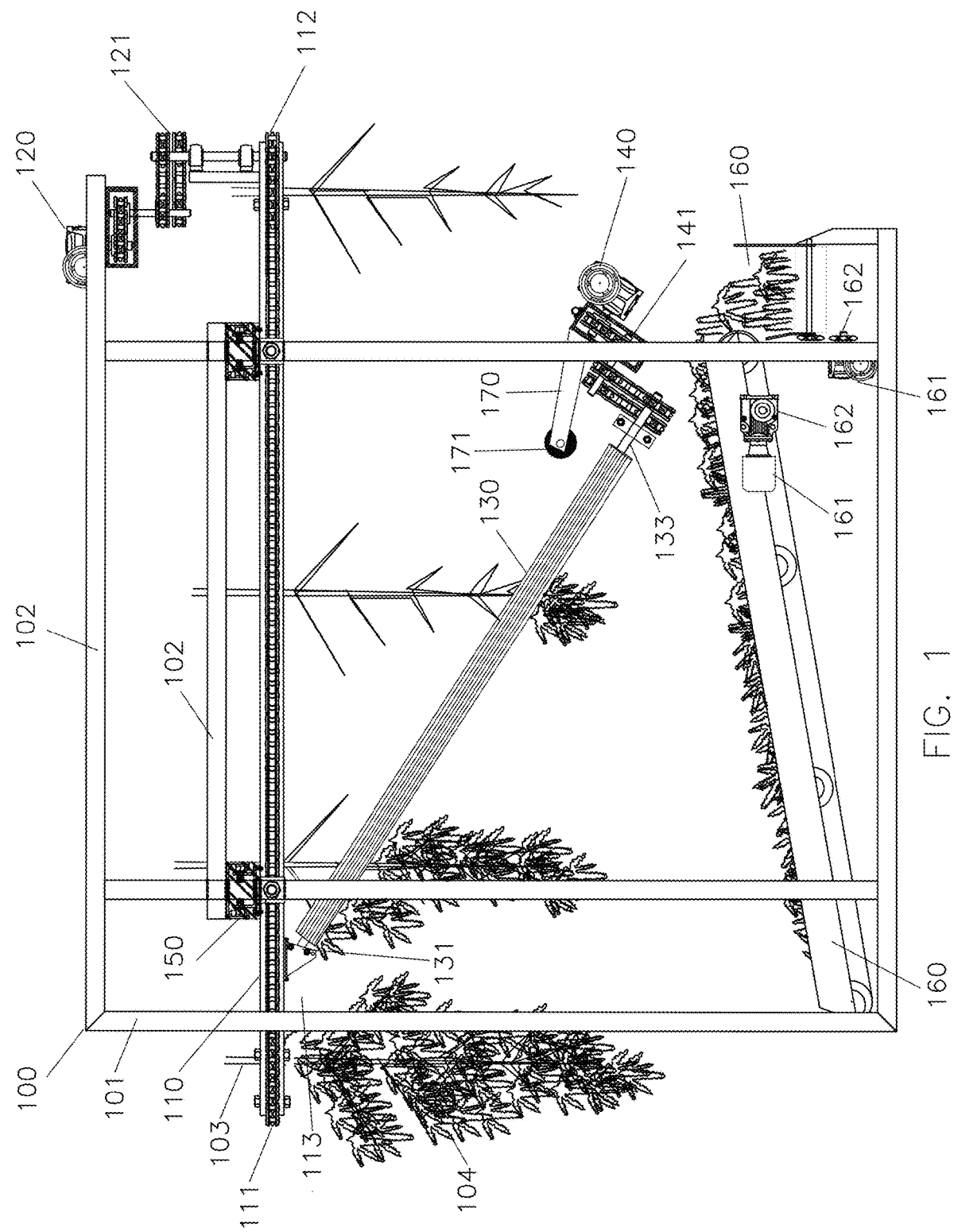

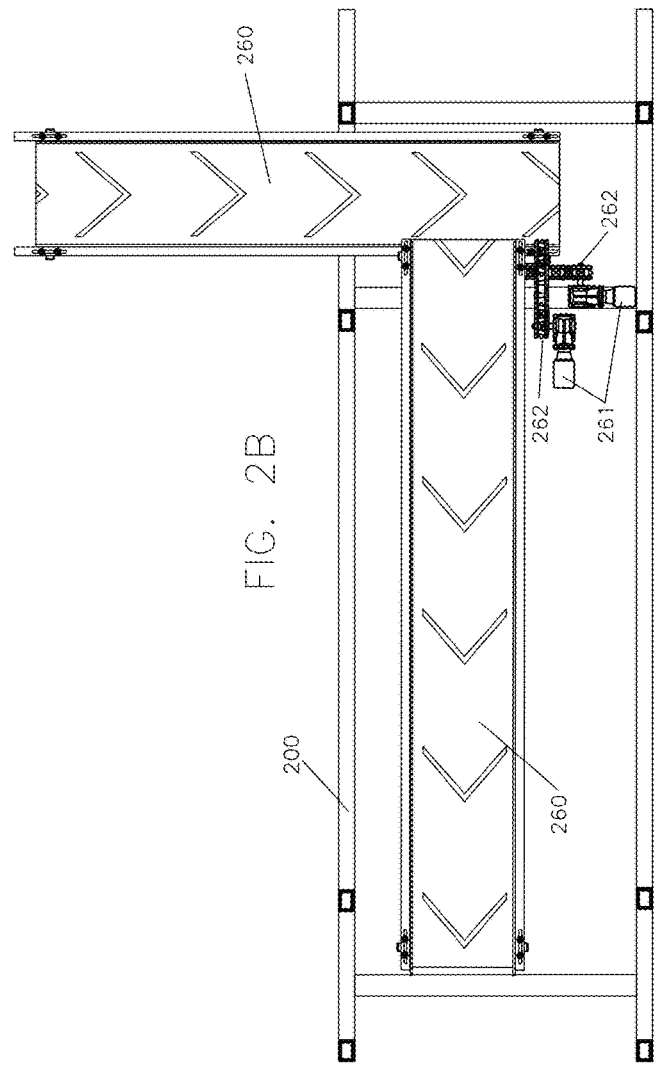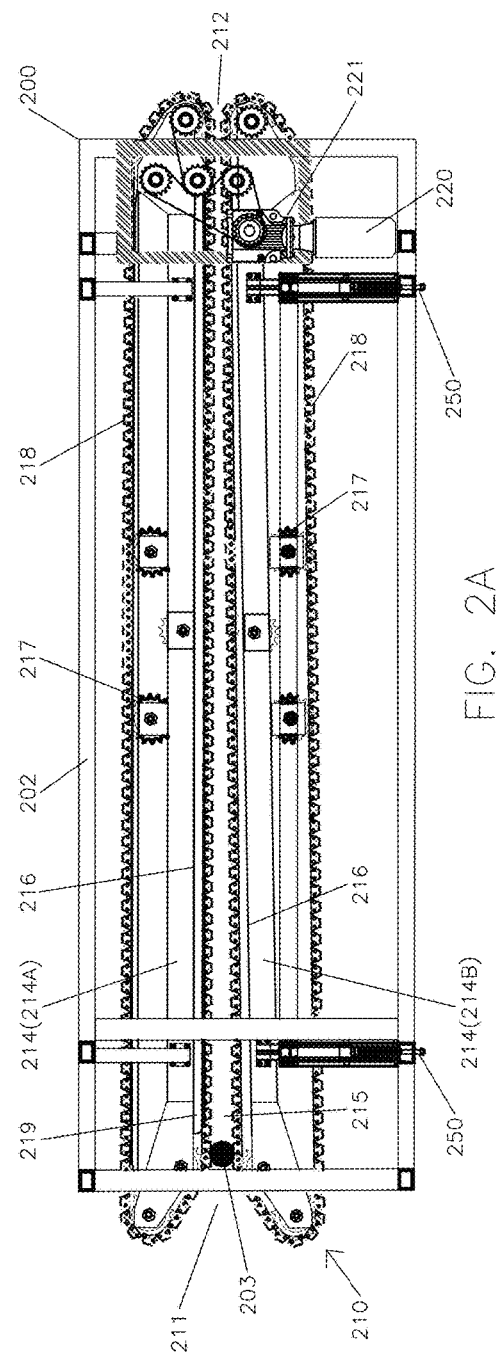

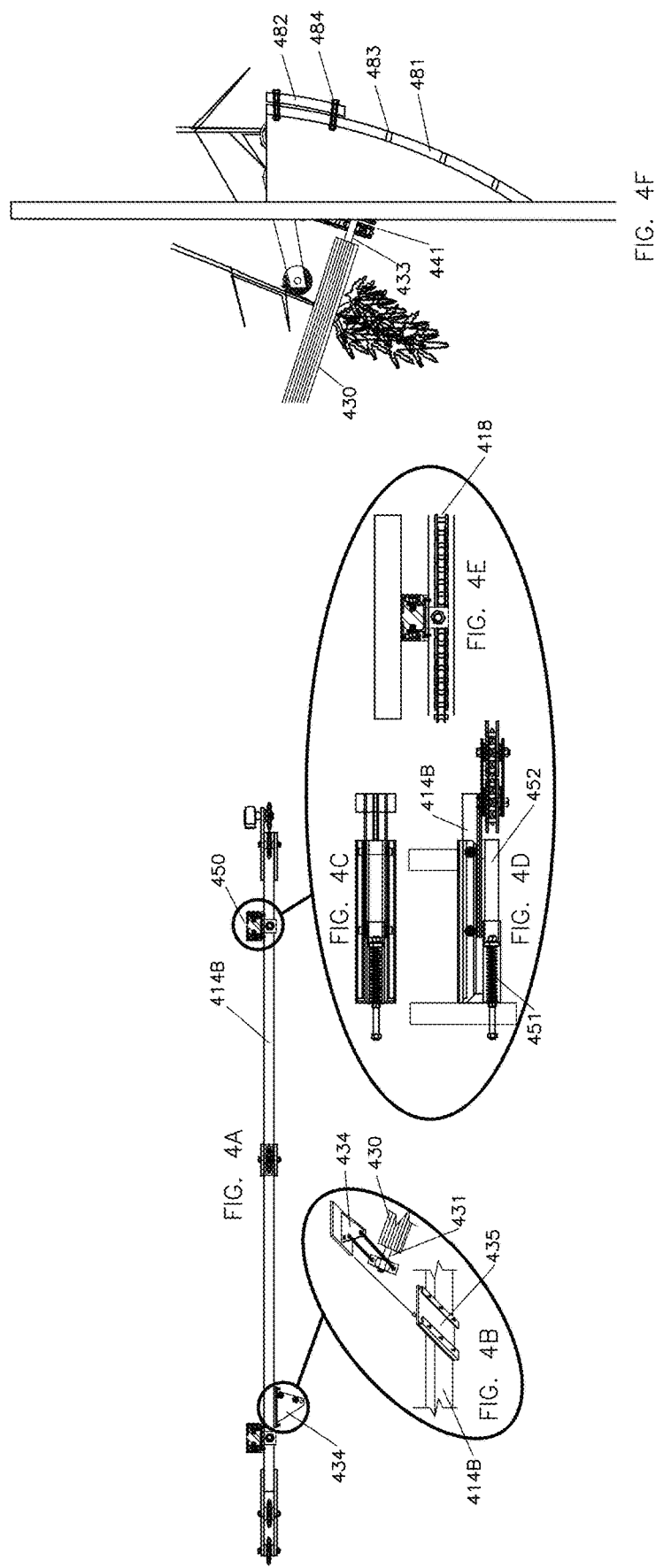

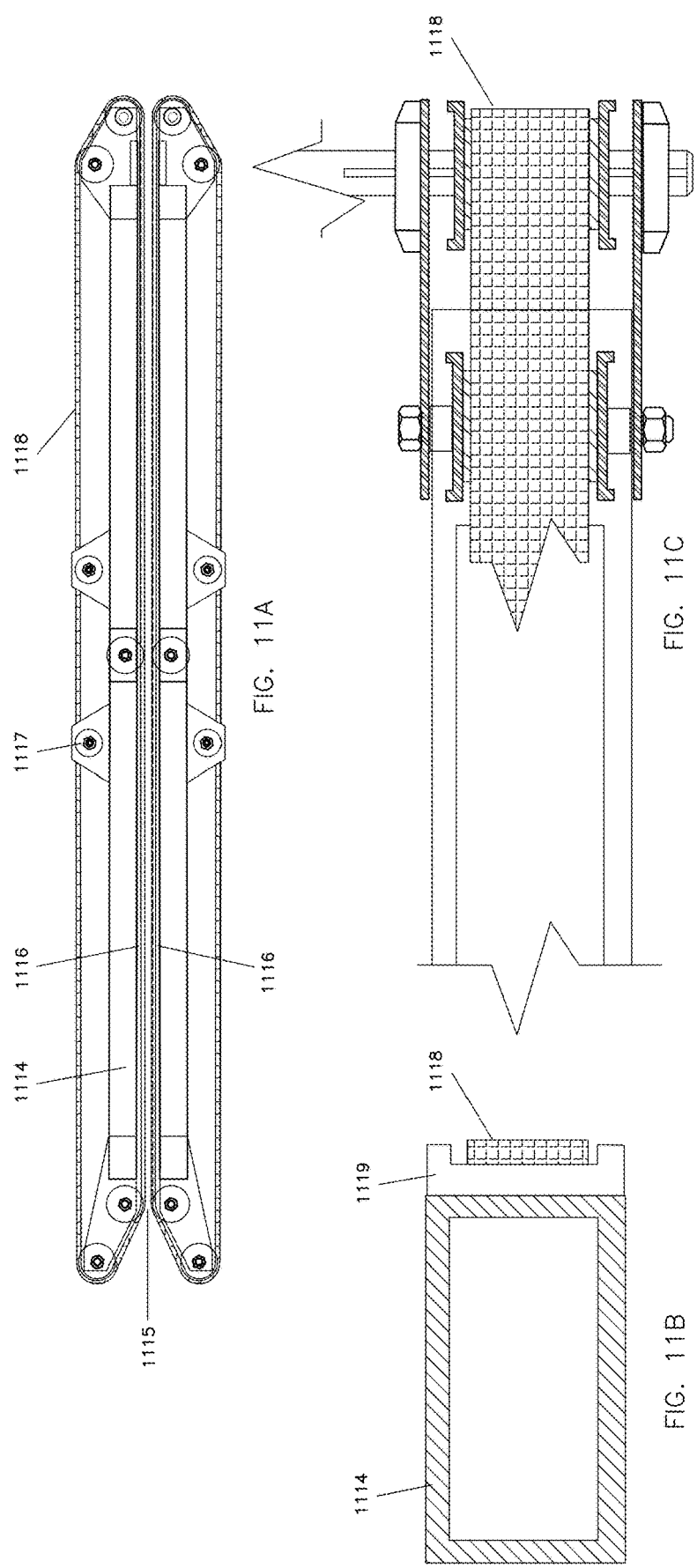

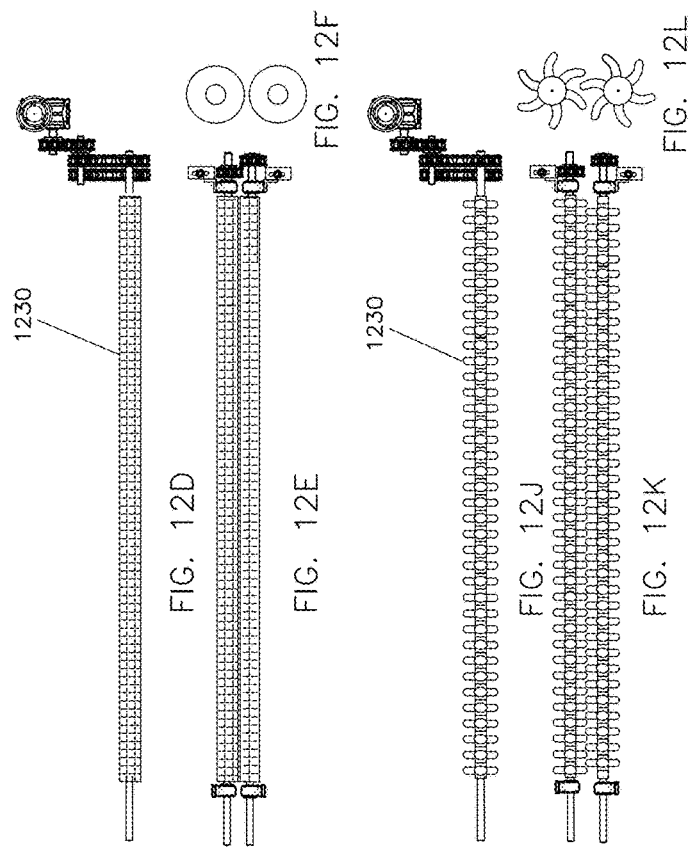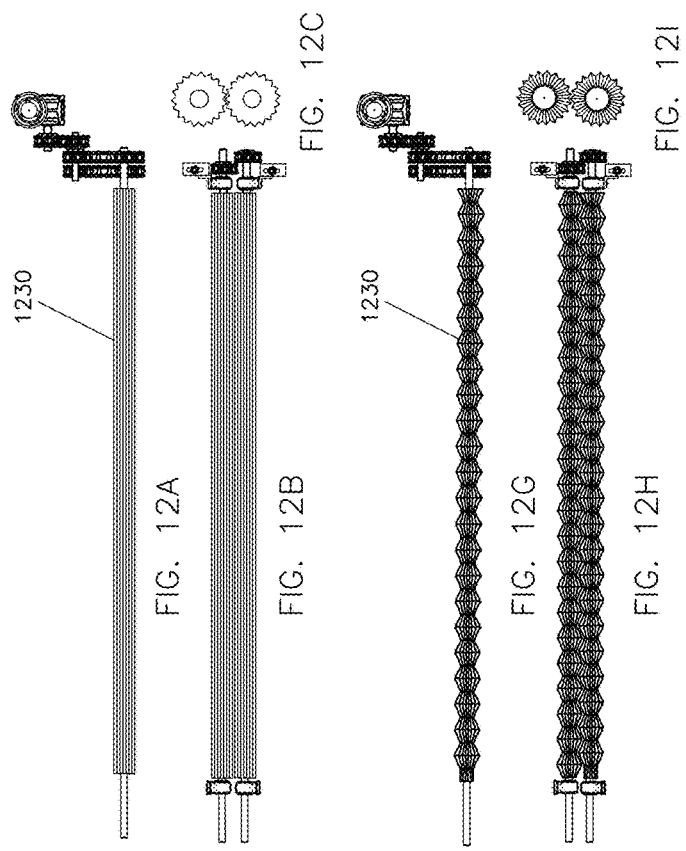

SYSTEM AND METHOD FOR REMOVING BIOMASS FROM STEM

BACKGROUND

In light of the increasing demand for crops such as cannabidiol (CBD)-bearing hemp plants due to their myriad of uses, there is an equally increasing need for more efficient systems for harvesting such crops faster and more effectively.

Methods for removing the biomass of a CBD-bearing hemp plant from the stem, such as pulling the stem through a hole in a draw plate, can be simple and relatively inexpensive, but are nevertheless highly inefficient. In particular, such draw plates are limited to only processing one stem at a time, and the stem cannot have knots. In other words, stems with knots must be prepared ahead of time before being pulled through the draw plate, and thus processing such plants through the use of a draw plate is extremely time consuming and inefficient.

SUMMARY

The above problems are addressed by the current disclosure by providing a system for removing biomass from a stem, which includes a conveyor mechanism that moves the stem in a conveying direction, a pair of rollers which exert a rubbing force between each other for removing the biomass from the stem, and a tensioning system arranged to exert a force which holds the stem to the conveyor mechanism. The rollers are angled downward from the first axial ends of the rollers to the second axial ends, and the conveyor mechanism moves the stem so as to pass between the rollers such that the rubbing force removes the biomass from the stem, and such that the rubbing force moves downward along the stem as the stem moves in the conveying direction.

Due to the rubbing force between the angled rollers, this system is able to remove the biomass from large quantities of stems very quickly and effectively. Further, due to features discussed below, the system is adjustable to accommodate crops with stems have a wide range of diameters and lengths, and thus the crops can be quickly processed regardless of the presence of knots or other variations in the stems.

BRIEF DESCRIPTION OF THE DRAWINGS

FIG. 1 is a side view of a system for removing biomass from a stem, in accordance with one embodiment.

FIG. 2A is a top view of a conveyor mechanism in accordance with one embodiment.

FIG. 2B is a top view of a conveyor belt assembly in accordance with one embodiment.

FIG. 4A is a side view of a conveyor mechanism in accordance with one embodiment.

FIG. 4B is an enlarged detail view of the bracket shown in FIG. 4A, in accordance with one embodiment.

FIG. 4C is an enlarged detail top view of the tensioning system of FIG. 4A, in accordance with one embodiment.

FIG. 4D is an enlarged detail side view of the tensioning system of FIG. 4C.

FIG. 4E is an enlarged detail end view of the tensioning system of FIG. 4C.

FIG. 4F is a side view of a support structure in accordance with one embodiment.

FIG. 11A is a top view of a conveyor mechanism in accordance with one embodiment.

FIG. 11B is a cross-sectional view of one of the support members of the conveyor mechanism shown in FIG. 11A.

FIG. 11C is a side view of one of the conveying layers of the conveyor mechanism shown in FIG. 11A.

FIG. 12A is a side view of a pair of rollers in accordance with one embodiment.

FIG. 12B is a top view of the pair of rollers shown in FIG. 12A.

FIG. 12C is an end view of the pair of rollers shown in FIG. 12B.

FIG. 12D is a side view of a pair of rollers in accordance with one embodiment.

FIG. 12E is a top view of the pair of rollers shown in FIG. 12D.

FIG. 12F is an end view of the pair of rollers shown in FIG. 12E.

FIG. 12G is a side view of a pair of rollers in accordance with one embodiment.

FIG. 12H is a top view of the pair of rollers shown in FIG. 12G.

FIG. 12I is an end view of the pair of rollers shown in FIG. 12H.

FIG. 12J is a side view of a pair of rollers in accordance with one embodiment.

FIG. 12K is a top view of the pair of rollers shown in FIG. 12J.

FIG. 12L is an end view of the pair of rollers shown in FIG. 12K.

Figure 3A:
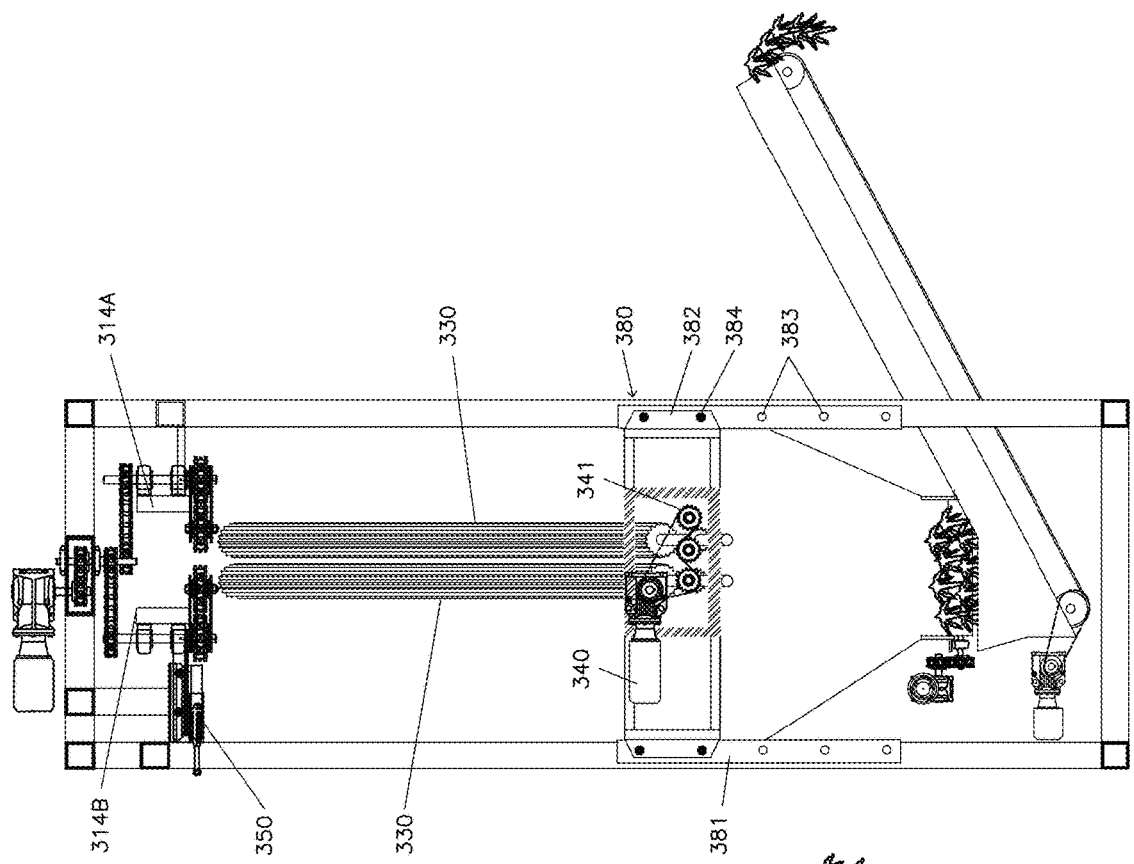
FIG. 3A is an end view of a system for removing biomass from a stem, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

FIG. 1 is a side view of a system for removing biomass from a stem, in accordance with one embodiment.

FIG. 1 shows a system for removing biomass 104 from a stem 103. The biomass 104 can be anything such as, for example, foliage, buds, seeds or flowers. The system includes a frame 100 having a plurality of leg members 101 extending in a vertical direction, and transverse members 102 connected to the leg members 101 so as to be perpendicular to the leg members 101 and extend in a length direction of the frame 100. FIG. 1 also shows a conveyor mechanism 110 which moves the stem 103 in a horizontal conveying direction from an inlet end 111 of the conveyor mechanism 110 to an outlet end 112 of the conveyor mechanism 110, with the conveyor mechanism 110 being connected to an upper portion of the frame 100. Further a motor 120 and a transmission 121 are attached to the frame 100, with the motor 120 and transmission 121 being arranged to drive the conveyor mechanism 110.

As also shown in FIG. 1, a pair of rollers 130 are arranged to exert a rubbing force between each other for removing the biomass 104 from the stem 103, and a motor 140 and a transmission 141 are supported by the frame 100 and are arranged to counter-rotate the pair of rollers 130. Further, a tensioning system 150 is attached to the frame 100, with the tensioning system 150 being arranged to exert a force which holds the stem 103 to the conveyor mechanism 110.

As is also shown in FIG. 1, a first axial end 131 of each roller 130 is connected to an inlet end side 113 of the conveyor mechanism 110, and a second axial end 133 of each roller 130 is connected to the transmission 141 such that the rollers 130 are angled downward from the first axial ends 131 of the rollers 130 at the inlet end side 113 of the conveyor mechanism 110 to the second axial ends 133 of the rollers 130. Due to this configuration, the conveyor mechanism 110 moves the stem 103 so as to pass between the rollers 130 such that the rubbing force of the rollers 130 removes the biomass 104 from the stem 103, and as shown in FIG. 1, such that the rubbing force for removing the biomass 104 moves downward along the stem 103 as the stem 103 moves in the conveying direction.

The system can also include, for example, one or more conveyor belt assemblies 160 at the bottom of the frame 100 to collect and transport the removed biomass 104, as shown in FIG. 1, with each conveyor belt assembly 160 having an associated motor 161 and transmission 162.

In one embodiment, the system can also include an arm 170 which is connected to the transmission 141 and extends from the transmission 141 toward the pair of rollers 130, and a protective roller 171 arranged at an end of the arm 170 and positioned above the pair of rollers 130, as shown in FIG. 1. In this regard, the protective roller 171 is positioned so as to deflect stems 103 being moved by the conveyor mechanism 110 away from the transmission 141 and thus prevent the stems 103 from being caught in the transmission 141.

FIG. 2A is a top view of a conveyor mechanism in accordance with one embodiment, and in one exemplary embodiment, corresponds to the conveyor mechanism 110 shown in FIG. 1.

FIG. 2A shows a conveyor mechanism 210 supported by a frame 200 having transverse members 202. The conveyor mechanism 210 includes two support members 214, with each support member 214 having a length which extends in the length direction of the frame 200 (the left-right direction in FIG. 2A). As also shown in FIG. 2A, the support members 214 are arranged alongside each other so as to define a conveying path 215 between mutually opposing lengthwise surfaces 216 of the support members 214.

Each support member 214 includes a plurality of rotational elements 217. Further, the conveyor mechanism 210 includes two conveying layers 218, with each conveying layer 218 forming a loop around a respective one of the support members 214 and being supported by the rotational elements 217 of the respective one of the support members 214. Further, each conveying layer 218 extends along the mutually opposing lengthwise surface 216 of the corresponding support member 214.

In the embodiment shown in FIG. 2A, the motor 220 and the transmission 221 counter-rotate the conveying layers 218 such that each conveying layer 218 moves along the conveying path 215 from the inlet end 211 to the outlet end 212 (i.e., left to right in FIG. 2A) such that when the stem 203 is placed in the inlet end 211, the stem 203 is held between the conveying layers 218 and moved along the conveying path 215 from the inlet end 211 to the outlet end 212.

In one embodiment, one of the support members 214 is fixed to the frame 200 as a fixed support member 214A, and the other of the support members 214 is pivotably mounted to the frame 200 as a floating support member 214B. Further, as shown in FIG. 2A, the tensioning system 250 exerts a force on the floating support member 214B which biases the floating support member 214B towards the fixed support member 214A. Thus, in a state in which no stem is present in the conveying path, there is a zero tolerance (or nearly zero tolerance) between the conveying layers in the conveying path due to the biasing force of the tensioning system (see FIGS. 6B and 8, discussed below). However, as shown in FIG. 2A, when the stem 203 is placed in the inlet end 211, the conveying layers 218 pull the stem 203 into the conveying path 215 which forces the floating support member 214B away from the fixed support member 214A against the biasing force of the tensioning system 250. This allows the conveyor mechanism 210 to be able to take in stems or other materials with a diameter as small as a fraction of an inch up to a diameter of 4 inches (or more) and to ensure that those stems or materials will be gripped tightly by the conveying layers along the conveying path.

FIG. 2B is a top view of a conveyor belt assembly in accordance with one embodiment, and in one exemplary embodiment, corresponds to the conveyor belt assembly 160 shown in FIG. 1.

In particular, FIG. 2B shows for example two conveyor belt assemblies 260 at the bottom of the frame 200 to collect and transport the removed biomass, with each conveyor belt assembly 260 having an associated motor 261 and transmission 262.

Figure 3B:
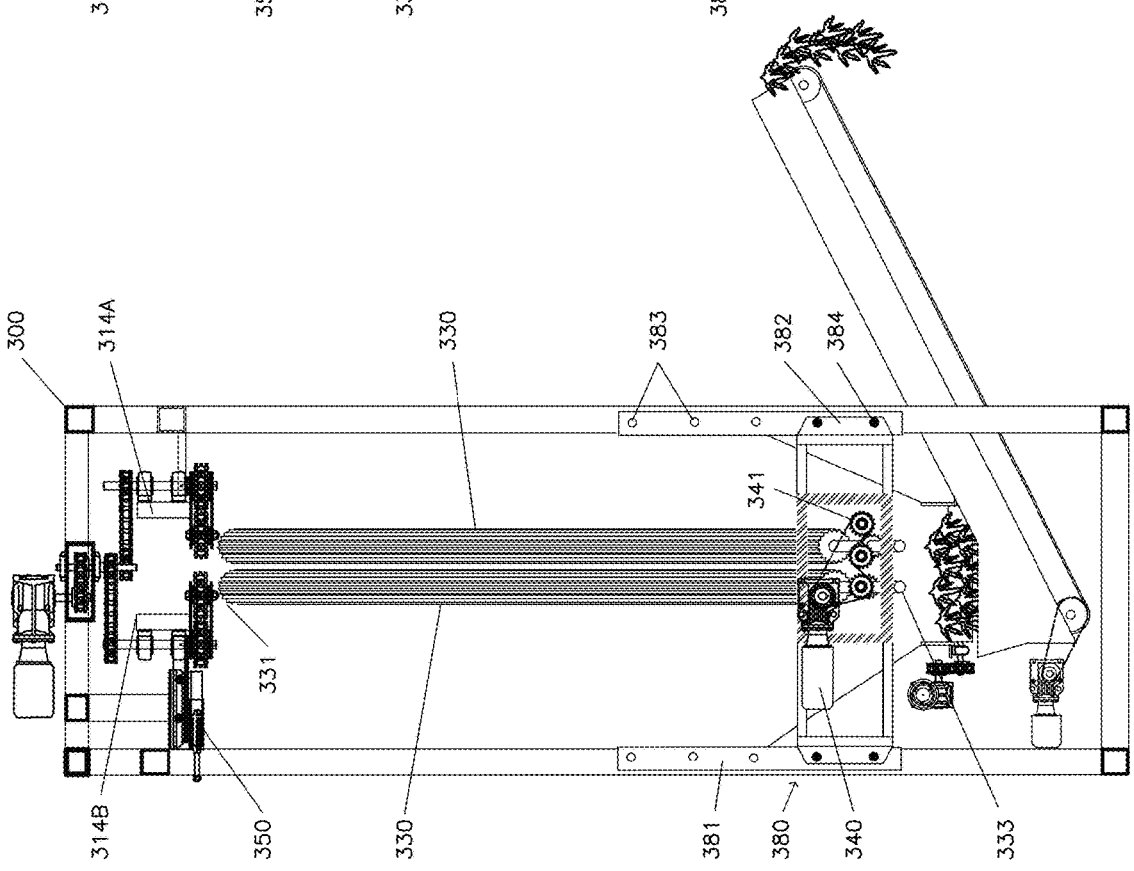
FIG. 3B is an end view of the system shown in FIG. 3A, with the angle of the rollers having been adjusted in accordance with one embodiment.

FIG. 3A is an end view of a system for removing biomass from a stem in accordance with one embodiment, and in one exemplary embodiment corresponds to the system shown in FIGS. 1 and 2A. FIG. 3B is an end view of the system shown in FIG. 3A, with the angle of the rollers having been adjusted in accordance with one embodiment.

In particular, FIG. 3A shows a frame 300, a conveyor mechanism having a fixed support member 314A and a floating support member 314B (via a tensioning system 350) and a pair of rollers 330 for removing biomass. Further, the first axial end 331 of one of the rollers (the right roller in FIG. 3A) is connected to an inlet end side of the fixed support member 314A, and the first axial end 331 of the other of the rollers (the left roller in FIG. 3A) is connected to an inlet end side of the floating support member 314B, with the second axial ends 333 of both rollers being connected to the transmission 341.

As is similarly discussed above with respect to FIG. 2A, placing a stem into the inlet of the conveyor mechanism forces the floating support member 314B away from the fixed support member 314A against the biasing force of the tensioning system 350 in order to allow for the stem to enter the conveying path while ensuring that the stem is gripped tightly. Further, because the first axial end 331 of one of the rollers is connected to the inlet end side of the fixed support member 314A, and the first axial end 331 of the other of the rollers is connected to an inlet end side of the floating support member 314B, placing a stem into the inlet of the conveyor mechanism will also force the first axial end of one of the rollers (the roller with its first axial end connected to the inlet end side of the floating support member) away from the other roller in order to allow for the biomass to enter between the pair of rollers.

FIG. 3A also shows a support structure 380 which includes a first portion 381 that is attached to the frame 300 and has holes 383 spaced apart from each other at a plurality of heights along the first portion 381. The support structure 380 also has a second portion 382 which includes fasteners 384 which are engageable with the holes 383. The fasteners 384 can be any fasteners, such as pins or bolts, which can be selectively engaged with the holes 383 to secure the position of the support structure and disengaged from the holes 383 to allow for the position of the support structure to be adjusted. In one embodiment, the second portion 382 is adjustably coupled to the first portion 381 by the fasteners 384 being engaged with the holes 383 at a selected one of the heights.

Further, the motor 340 and the transmission 341 (which is connected to the second axial ends 333 of the rollers 330) are attached to the second portion 382 of the support structure such that a height of the second axial ends 333 of the rollers 330 is determined by the selected one of the heights at which the fasteners 384 are engaged with the holes 383 of the first portion 381. Thus, by adjusting the position of the second portion 382, the height of the second axial ends 333 of the rollers can be adjusted (which therefore changes the angle of the rollers) from the position shown in FIG. 3A (which, in one embodiment, corresponds to the angle of the rollers shown in FIG. 1) to the position shown in FIG. 3B (which, in one embodiment, corresponds to the angle of the rollers shown in FIG. 5, discussed below), or to any of the positions in between. As a result, the height of the second axial ends of the rollers can be adjusted so that the rollers are angled in the way which is most effective for removing the biomass in view of the length (or height) of the stems to be placed in the conveyor mechanism.

FIG. 4A is a side view of a conveyor mechanism in accordance with one embodiment. In particular, FIG. 4A shows a floating support member 414B having a bracket 434 and a tensioning system 450.

FIG. 4B is an enlarged detail view of the connections at the bracket shown in FIG. 4A, in accordance with one exemplary embodiment. In particular, FIG. 4B shows how the first axial end of a roller is connected to the inlet end side of a support member in accordance with one embodiment. As shown in FIG. 4B, the first axial end 431 of the roller 430 is connected to the bracket 434, and a slotted bracket 435 is connected to the underside of the floating support member 414B. Further, the upper portion of the bracket 434 fits into the slotted bracket 435 and the screws of the slotted bracket 435 are tightened to secure the bracket 434. In this regard, the slotted bracket 435 is long enough to allow for adjustment of the lateral position of the bracket 434 (prior to tightening of the screws), which may be desired based on the size of the roller. The first axial ends of additional rollers can be attached to other support members, such as a fixed support member, in the same manner.

FIG. 4C is an enlarged detail top view of the tensioning system of FIG. 4A, in accordance with one embodiment. FIG. 4D is an enlarged detail side view of the tensioning system of FIG. 4C. FIG. 4E is an enlarged detail end view of the tensioning system of FIG. 4C. In one exemplary embodiment as shown in FIGS. 4C-E, the tensioning system 450 includes a spring 451 and a slide member 452 which extends towards the conveying layer 418 and which is connected with the floating support member 414B. Through this configuration of the spring 451 and the slide member 452, the tensioning system 450 exerts the biasing force on the floating support member 414B.

In various specific illustrative embodiments, the tensioning systems can include, but are not limited to, springs, air or gas-based tensioners, hydraulic tensioners, and/or any mechanisms known for providing tension as discussed herein and/or as known in the art.

FIG. 4F is a side view of a support structure in accordance with one embodiment, and in one exemplary embodiment, corresponds to the support structure 380 shown in FIGS. 3A-B. FIG. 4F shows a first portion 481 of a support structure that is attached to the frame 400 and has holes 483 spaced apart from each other at a plurality of heights along the first portion 481. The support structure also has a second portion 482 which includes fasteners 484 which are engageable with the holes 483. The fasteners 484 can be any fasteners, such as pins or bolts, which can be selectively engaged with the holes 483 to secure the position of the support structure and disengaged from the holes 483 to allow for the position of the support structure to be adjusted. In one embodiment, the second portion 482 is adjustably coupled to the first portion 481 by the fasteners 484 being engaged with the holes 483 at a selected one of the heights.

Further, FIG. 4F shows the transmission 441 which is connected to the second axial ends 433 of the rollers 430 is attached to the second portion 482 of the support structure such that a height of the second axial ends 433 of the rollers 430 is determined by the selected one of the heights at which the fasteners 484 are engaged with the holes 483 of the first portion 481. In this regard, FIG. 4F shows the second portion 482 at a position which corresponds to that of the second portion 382 shown in FIG. 3B.

Figure 5:
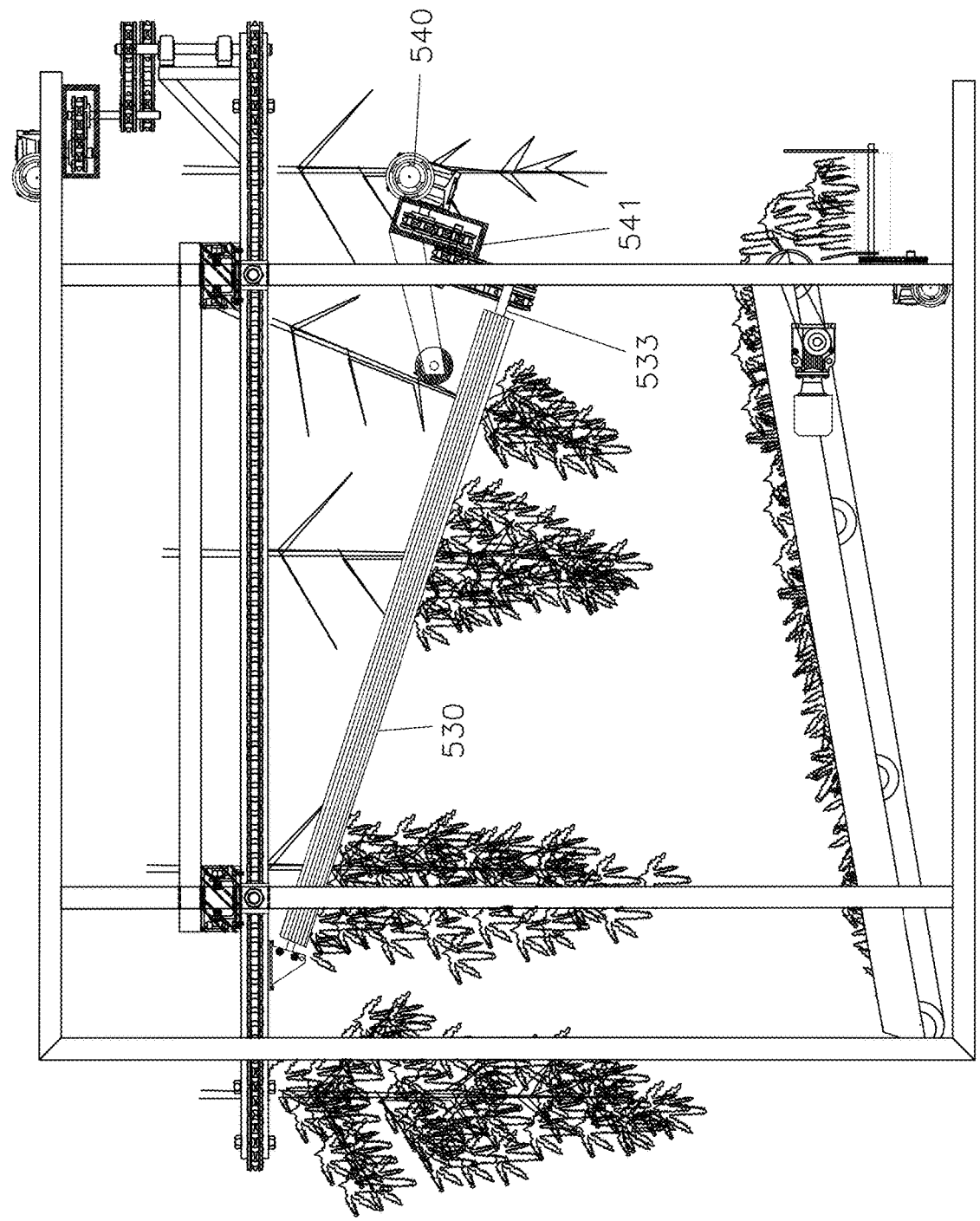
FIG. 5 is a side view of a system for removing biomass from a stem, in accordance with one embodiment.

FIG. 5 is a side view of a system for removing biomass from a stem, in accordance with one embodiment. The system of FIG. 5 generally corresponds to the system shown in FIG. 1, but differs in that the transmission 541 and 540 are at a higher position (correspond to that shown in FIG. 3B). As the transmission 541 is connected to the second axial end 533 of the rollers 530, the higher positioning of the transmission 541 results in a shallower angle of the rollers 530 as compared to the angle shown in FIG. 1.

Figure 6:
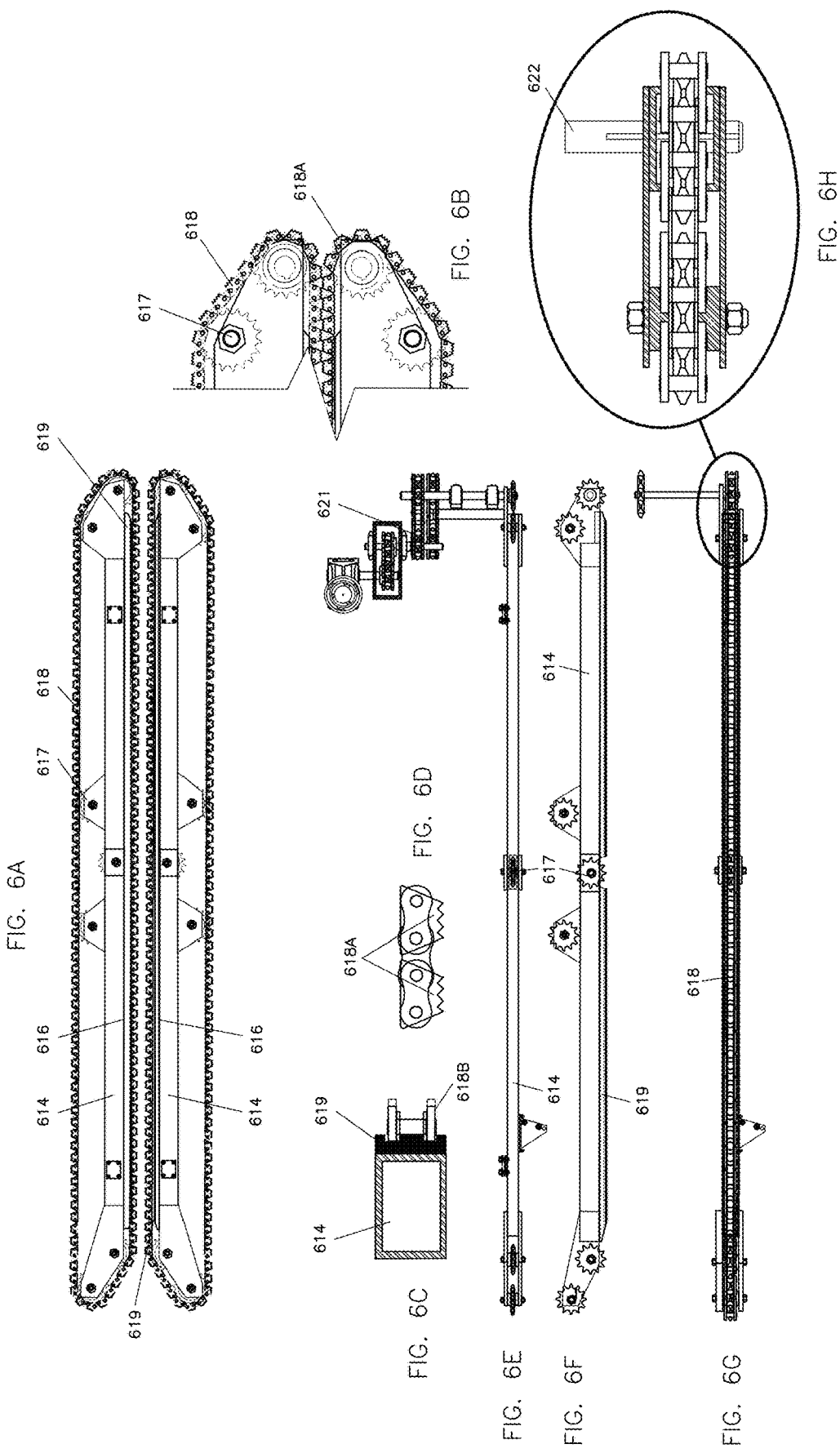
FIG. 6A is a top view of components of a conveyor mechanism in accordance with one embodiment.
FIG. 6B is an enlarged view of an end of a conveyor mechanism in accordance with one embodiment.
FIG. 6C is a cross-sectional view of a support member of a conveyor mechanism in accordance with one embodiment.
FIG. 6D is a side view of components of a conveying layer in accordance with one embodiment.
FIG. 6E is a side view of a support member of a conveyor mechanism in accordance with one embodiment.
FIG. 6F is a top view of the support member shown in FIG. 6E.
FIG. 6G is a side view of the support member shown in FIG. 6E together with a conveying layer.
FIG. 6H is an enlarged detail view of the connection between the conveying layer and the transmission shown in FIG. 6G.

FIG. 6A is a top view of components of a conveyor mechanism in accordance with one embodiment. FIG. 6A shows two support members 614 of a conveyor mechanism, with each support member 614 including a plurality of rotational elements 617 and a conveying layer 618 forming a loop around the support member and being supported by the rotational elements of the support member. Further, each conveying layer 618 extends along the mutually opposing lengthwise surface 616 of the corresponding support member 614.

In one embodiment, the conveying layer is made of a sharp top roller chain (or sharp tooth roller chain), in which plates with teeth on one side are supported by roller bushings, as shown for example in FIGS. 6B-D.

As shown for example in FIG. 6B, which is an enlarged view of an end of a conveyor mechanism in accordance with one embodiment, the conveying layer 618 is made of a sharp top roller chain having plates 618A with teeth on one side, and in a state in which no stem is present in the conveying path, there is a zero tolerance (or nearly zero tolerance) between the plates 618A of the conveying layers 618 in the conveying path due to the biasing force of the tensioning system.

FIG. 6A also shows a slide 619 arranged along each of the mutually opposing lengthwise surfaces 616 of the support members 614. As shown in FIG. 6C, which is a cross-sectional view of a support member of a conveyor mechanism in accordance with one embodiment, the slide 619 is contoured (having an E-shape in cross-section) to support the bushings 618B of the roller chain. The slide 619 is made of, for example, polytetrafluoroethylene (PTFE) or high-density polyethylene (HDPE), and is provided in order to protect the support member from wear and to maintain the alignment of the roller chain.

FIG. 6E is a side view of a support member of a conveyor mechanism in accordance with one embodiment, and in one exemplary embodiment, is a side view of one of the support members 614 shown in FIG. 6A with the conveying layer 618 removed.

FIG. 6F is a top view of the support member 614 shown in FIG. 6E, showing the location of the slide 619.

FIG. 6G is a side view of the support member 614 shown in FIG. 6E together with the conveying layer 618.

FIG. 6H is an enlarged detail view which, together with FIGS. 6E and 6G, shows the connection between the conveying layer 618 and the transmission 621 through a keyed shaft 622.

Figure 7:
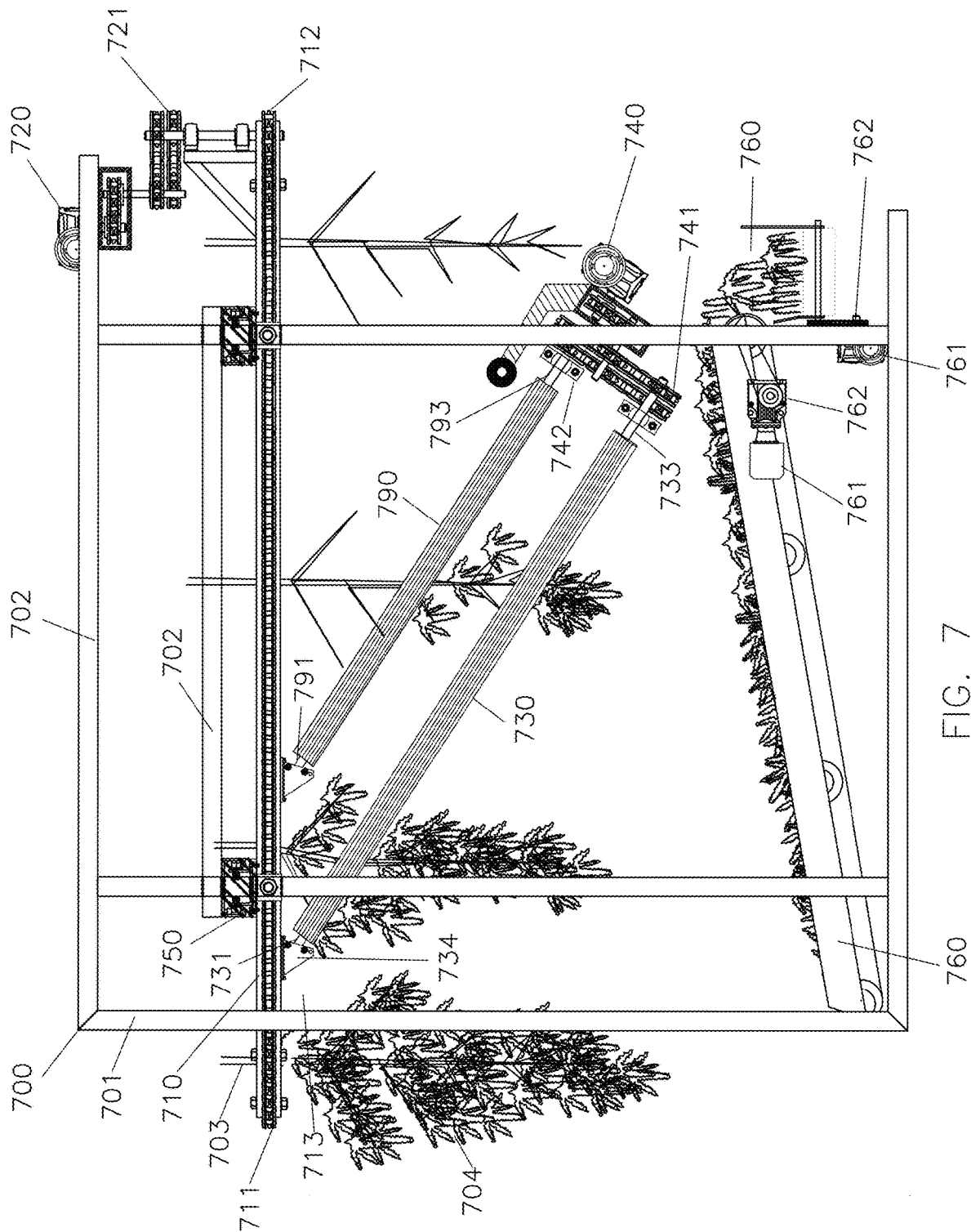
FIG. 7 is a side view of a system for removing biomass from a stem, in accordance with one embodiment.

FIG. 7 is a side view of a system for removing biomass from a stem, in accordance with one embodiment.

FIG. 7 shows a system for removing biomass 704 from a stem 703. The system includes a frame 700 having a plurality of leg members 701 extending in a vertical direction, and transverse members 702 connected to the leg members 701 so as to be perpendicular to the leg members 701 and extend in a length direction of the frame 700. FIG. 7 also shows a conveyor mechanism 710 which moves the stem 703 in a horizontal conveying direction from an inlet end 711 of the conveyor mechanism 710 to an outlet end 712 of the conveyor mechanism 710, with the conveyor mechanism 710 being connected to an upper portion of the frame 700. Further, a motor 720 and a transmission 721 are attached to the frame 700, with the motor 720 and transmission 721 being arranged to drive the conveyor mechanism 710.

As also shown in FIG. 7, a pair of rollers 730 are arranged to exert a rubbing force between each other for removing the biomass 704 from the stem 703, and a motor 740 and a transmission 741 are supported by the frame 100 and are arranged to counter-rotate the pair of rollers 730. A pair of second rollers 790, having first axial ends 791 and second axial ends 793, are also provided, as discussed below. Further, a tensioning system 750 is attached to the frame 700, with the tensioning system 750 being arranged to exert a force which holds the stem 703 to the conveyor mechanism 710.

As is also shown in FIG. 7, a first axial end 731 of each roller 730 is connected to an inlet end side 713 of the conveyor mechanism 710, and a second axial end 733 of each roller 730 is connected to the transmission 741 such that the rollers 730 are angled downward from the first axial ends 731 of the rollers 730 at the inlet end side 713 of the conveyor mechanism 710 to the second axial ends 733 of the rollers 730. Due to this configuration, the conveyor mechanism 710 moves the stem 703 so as to pass between the rollers 730 such that the rubbing force of the rollers 730 removes the biomass 704 from the stem 703, and as shown in FIG. 7, such that the rubbing force for removing the biomass 704 moves downward along the stem 703 as the stem 703 moves in the conveying direction.

The system can also include, for example, one or more conveyor belt assemblies 760 at the bottom of the frame 700 to collect and transport the removed biomass 104, as shown in FIG. 7, with each conveyor belt assembly 760 having an associated motor 761 and transmission 762.

Figure 8:
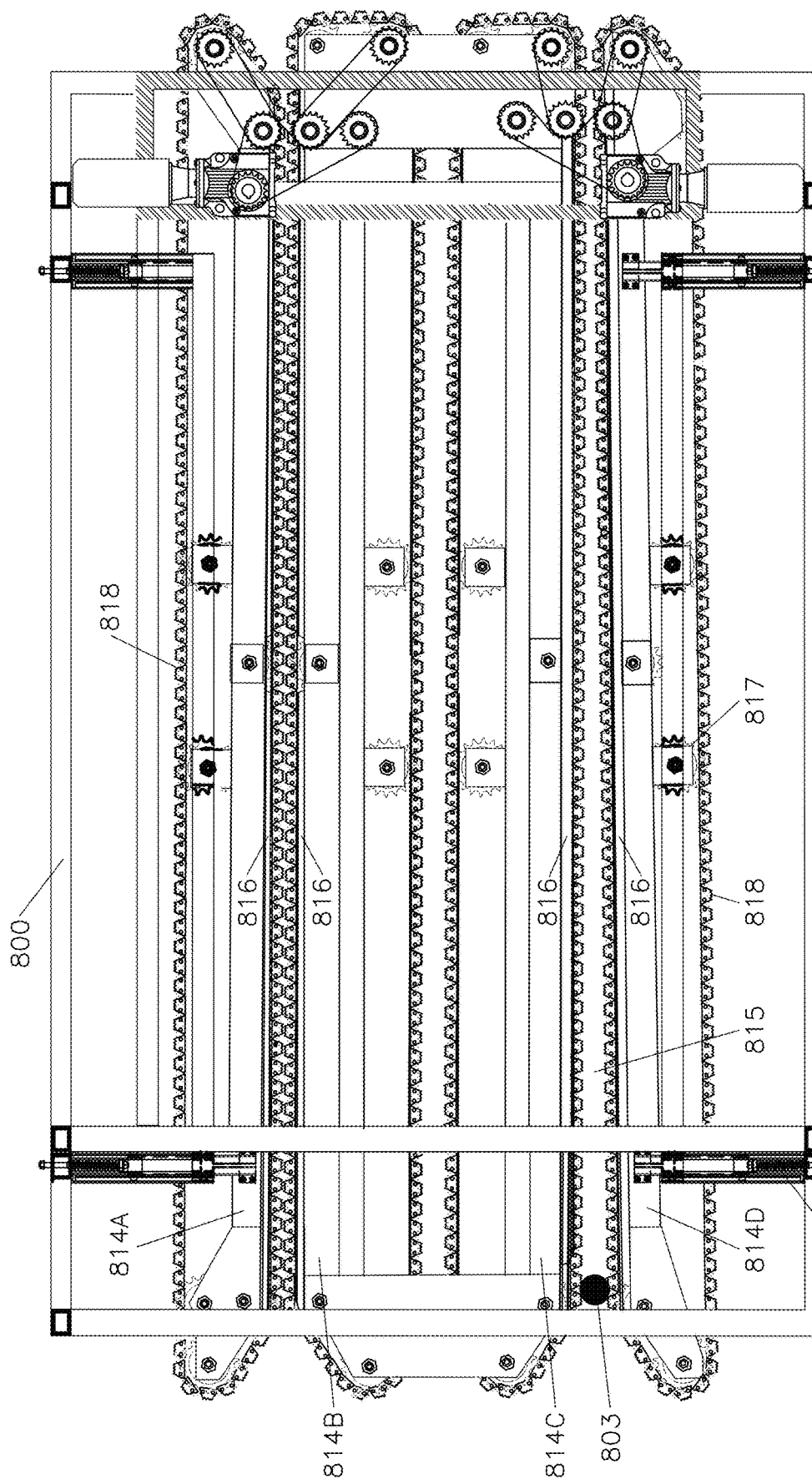
FIG. 8 is a top view of a conveyor mechanism in accordance with one embodiment.

FIG. 8 is a top view of a conveyor mechanism in accordance with one embodiment, and in one exemplary embodiment, corresponds to the conveyor mechanism 710 shown in FIG. 7.

FIG. 8 shows a frame 800 which supports a conveyor mechanism having four support members 814A-D, with each support member 814 having a length which extends in the length direction of the frame 800 (the left-right direction in FIG. 8). As also shown in FIG. 8, the support members 814C and 814D are arranged alongside each other so as to define a conveying path 815 between mutually opposing lengthwise surfaces 816 of the support members 814C and 814D. Similarly, FIG. 8 shows that support members 814A and 814B are arranged alongside each other so as to define a conveying path between mutually opposing lengthwise surfaces 816 of the support members 814A and 814B, with the support members 814B and 814C being parallel to each other.

Each support member 814 includes a plurality of rotational elements 817. Further, four conveying layers 818 are provided, with each conveying layer 818 forming a loop around a respective one of the support members 814 and being supported by the rotational elements 817 of the respective one of the support members 814. As also shown in FIG. 8, each conveying layer 818 extends along the mutually opposing lengthwise surface 816 of the corresponding support member 814.

In the embodiment shown in FIG. 8, the conveying layers 818 corresponding to the support members 814C and 814D move the stem 803 along the conveying path 815 from the inlet end to the outlet end (i.e., left to right in FIG. 8) such that when the stem 803 is placed in the inlet end, the stem 803 is held between the corresponding conveying layers 818 and moved along the conveying path 815. Similarly, the conveying layers 818 corresponding to the support members 814A and 814B can simultaneously move another stem along a corresponding conveying path defined between the conveying layers 818 supported by the support members 814A and 814B in the same direction (i.e., left to right in FIG. 8).

In one embodiment, the support members 814B and 814C are fixed to the frame 800 as fixed support members, and the support members 814A and 814D are pivotably mounted to the frame 800 as floating support members. Further, as shown in FIG. 8, the tensioning system 850 exerts a force on the floating support members 814A and 814D which biases the floating support members 814A and 814D toward the adjacent fixed support members 814B and 814C, respectively. Thus, in a state in which no stem is present in a conveying path, there is a zero tolerance (or nearly zero tolerance) between the conveying layers in the conveying path due to the biasing force of the tensioning system, as shown in FIG. 8 between the conveying layers 818 corresponding to support members 814A and 814B. However, as shown in FIG. 8 between the conveying layers 818 corresponding to support members 814C and 814D, when the stem 803 is placed in the inlet end, the conveying layers 818 pull the stem 803 into the conveying path 815 which forces the floating support member 814D away from the fixed support member 814C against the biasing force of the tensioning system 850. This allows the conveyor mechanism to be able to take in stems or other materials in either (or both) conveying paths with a diameter as small as a fraction of an inch up to a diameter of 4 inches (or more) and to ensure that those stems or materials will be gripped tightly by the conveying layers along the conveying path.

Figure 9:
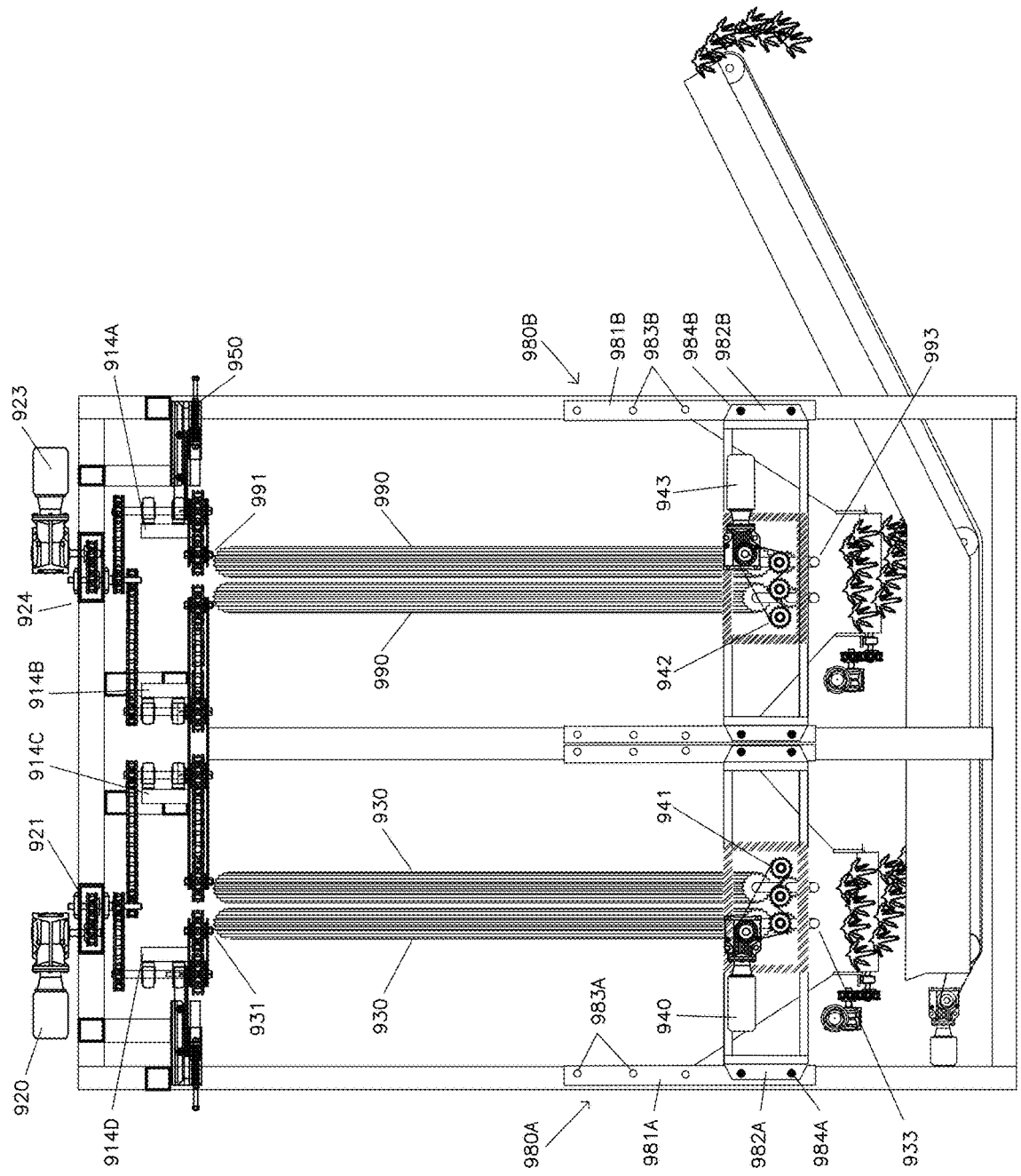
FIG. 9 is an end view of a system for removing biomass from a stem, in accordance with one embodiment.

FIG. 9 is an end view of a system for removing biomass from a stem, in accordance with one embodiment, and in one exemplary embodiment corresponds to the system shown in FIGS. 7-8.

In particular, FIG. 9 shows a conveyor mechanism having fixed support members 914B and 914C, and floating support members 914A and 914D (via a tensioning system 950). Additionally, FIG. 9 shows a pair of rollers 930 for removing biomass from stems carried along the conveying path between the support members 914C and 914D, and a pair of rollers 990 for removing biomass from stems carried along the conveying path between the support members 914A and 914B. FIG. 9 also shows a motor 920 and transmission 921 for counter-rotating the conveying layers around the support members 914C and 914D, and a motor 932 and transmission 924 for counter-rotating the conveying layers around the support members 914A and 914B.

Further, the first axial end 931 of one of the rollers (the right roller 930 in FIG. 9) is connected to an inlet end side of the fixed support member 914C, and the first axial end 931 of the other of the rollers (the left roller 930 in FIG. 9) is connected to an inlet end side of the floating support member 914D, with the second axial ends 933 of both rollers 930 being connected to the transmission 941. Similarly, the first axial end 991 of one of the rollers (the left roller 990 in FIG. 9) is connected to an inlet end side of the fixed support member 914B, and the first axial end 991 of the other of the rollers (the right roller 990 in FIG. 9) is connected to an inlet end side of the floating support member 914A, with the second axial ends 993 of both rollers 990 being connected to the transmission 942.

As is similarly discussed above with respect to FIG. 8, placing a stem into one of the conveying paths (for example, the conveying path between support members 914C and 914D) forces the corresponding floating support member 914D away from the fixed support member 914C against the biasing force of the tensioning system 950 in order to allow for the stem to enter the conveying path while ensuring that the stem is gripped tightly. Further, because the first axial end 931 of one of the rollers is connected to the inlet end side of the fixed support member 914C, and the first axial end 931 of the other of the rollers is connected to an inlet end side of the floating support member 914D, placing a stem into the inlet of the conveyor mechanism will also force the first axial end of one of the rollers (the roller with its first axial end connected to the inlet end side of the floating support member) away from the other roller in order to allow for the biomass to enter between the pair of rollers.

Similarly, placing a stem into the conveying path between support members 914A and 914B forces the floating support member 914A away from the fixed support member 914B against the biasing force of the tensioning system 950, and thus also forces the first axial ends of the rollers 990 away from each other.

FIG. 9 also shows a support structure 980A which includes a first portion 981A that is attached to the frame and has holes 983A spaced apart from each other at a plurality of heights along the first portion 981A. The support structure 980A also has a second portion 982A which includes fasteners 984A which are engageable with the holes 983A. FIG. 9 also shows a support structure 980B which includes a first portion 981B that is attached to the frame and has holes 983B spaced apart from each other at a plurality of heights along the first portion 981B. The support structure 980B also has a second portion 982B which includes fasteners 984B which are engageable with the holes 983B.

The fasteners 984A-B can be any fasteners, such as pins or bolts, which can be selectively engaged with the holes 983A-B to secure the position of the support structure and disengaged from the holes 983A-B to allow for the position of the support structure to be adjusted. In one embodiment, the second portions 982A and 982B are adjustably coupled to the first portions 981A and 981B by the fasteners 984A and 984B being engaged with the holes 983A and 983B, respectively, at a selected one of the heights.

Further, the motor 940 and the transmission 941 (which is connected to the second axial ends 933 of the rollers 930) are attached to the second portion 982A of the support structure such that a height of the second axial ends 933 of the rollers 930 is determined by the selected one of the heights at which the fasteners 984A are engaged with the holes 983A of the first portion 981A. Similarly, the motor 942 and the transmission 943 (which is connected to the second axial ends 993 of the rollers 990) are attached to the second portion 982B of the support structure such that a height of the second axial ends 993 of the rollers 990 is determined by the selected one of the heights at which the fasteners 984B are engaged with the holes 983B of the second portion 981B. Thus, by adjusting the position of the second portion 982A or 982B, the height of the second axial ends of the corresponding rollers 930 or 990 can be adjusted (which therefore changes the angle of the rollers). In this regard, while both second portions 982A and 982B are shown as being at the same height in FIG. 9, the heights of the second portions 982A and 982B can be set independently of each other.

Figure 10:
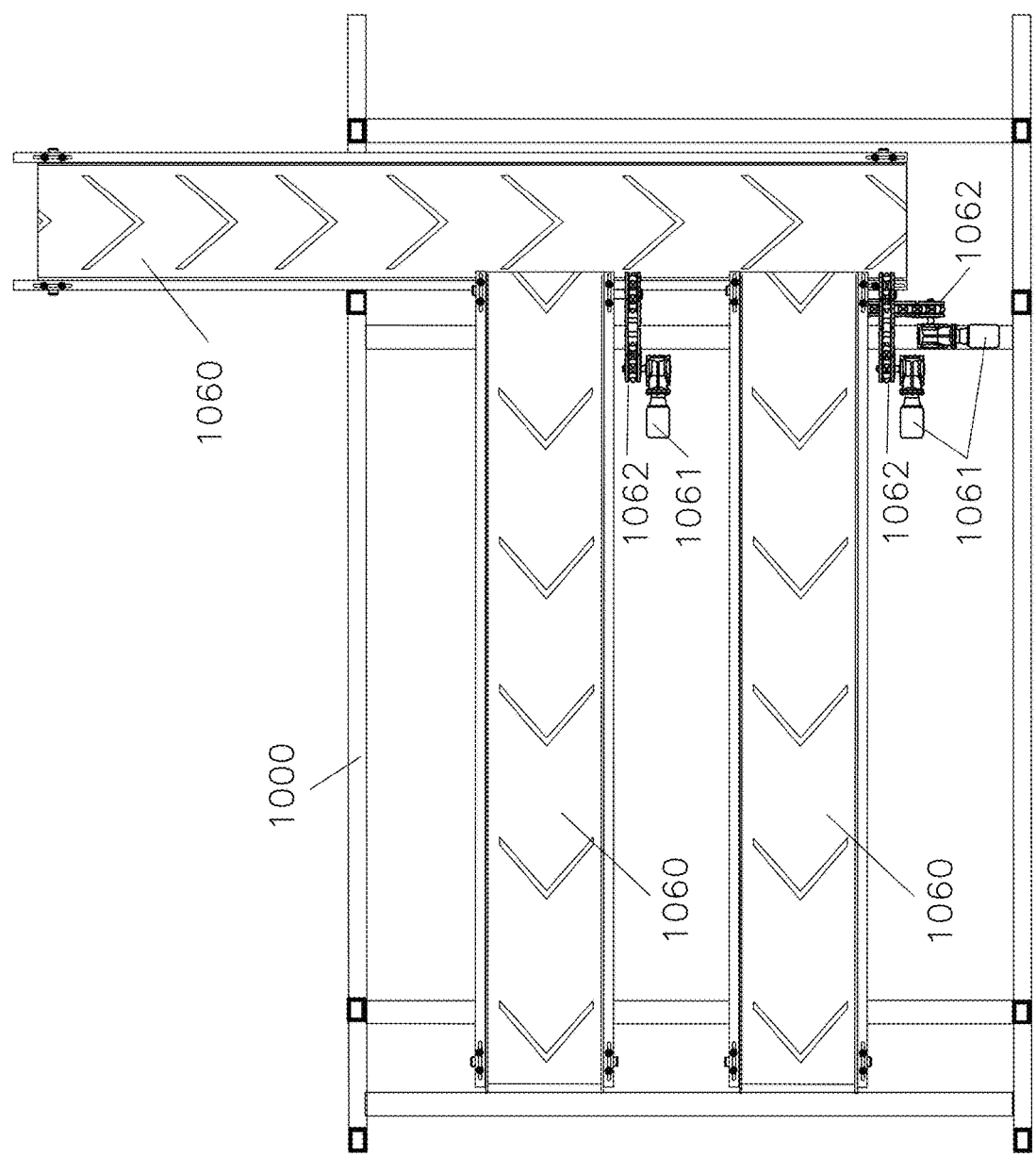
FIG. 10 is a top view of a conveyor belt assembly in accordance with one embodiment.

FIG. 10 is a top view of a conveyor belt assembly in accordance with one embodiment, and in one exemplary embodiment, corresponds to the conveyor belt assembly 760 shown in FIG. 7. In particular, FIG. 10 shows for example three conveyor belt assemblies 1060 at the bottom of the frame 1000 to collect and transport the removed biomass, with each conveyor belt assembly 1060 having an associated motor 1061 and transmission 1062.

FIG. 11A is a top view of a conveyor mechanism in accordance with one embodiment. FIG. 11 shows two support members 1114 of a conveyor mechanism, with each support member 1114 including a plurality of rotational elements 1117 and a conveying layer 1118 forming a loop around the support member and being supported by the rotational elements of the support member. Further, each conveying layer 1118 extends along the mutually opposing lengthwise surface 1116 of the corresponding support member 1114, with a conveying path 1115 being defined between the mutually opposing lengthwise surfaces 1116.

In one embodiment, the conveying layer is made of a grip belt (or grip top conveyor belt), as shown for example in FIGS. 11A-C.

As shown in FIG. 11B, which is a cross-sectional view of a support member of a conveyor mechanism in accordance with one embodiment, a slide 1119 is arranged on the mutually opposing lengthwise surface of each support member. The slide 1119 is made of, for example, PTFE or HDPE, and is provided in order to ensure positive pressure contact and alignment between the conveying layers.

FIGS. 12A-L show side, top and end views of various types of rollers 1230 which can be used as the pairs of rollers in any of the embodiments discussed above. For example, the pairs of rollers can be grooved rollers (FIGS. 12A-C), pinch rollers or textured rubber rollers (FIGS. 12D-F), acorn rollers (FIGS. 12G-I), or star-shaped or finger rollers (FIGS. 12J-L), In various embodiments, the pairs of rollers are made of any suitable material including, for example, metal, rubber or HDPE.

The embodiments described above contain several references to motors for driving components such as the conveyor mechanisms, pairs of rollers and conveyor belt assemblies. In these and various other embodiments, the motors can be fixed speed or variable speed motors by a variable frequency drive on three-phase AC motors, or by speed control on DC motors. In other embodiments, the conveyor mechanisms, pairs of rollers and conveyor belt assemblies can be driven hydraulically.

Several of the embodiments mentioned above are described as having the ability for the conveyor mechanisms and paired rollers to be able to spread apart from each other in order to accommodate for the diameter of the stalk. In connection with this feature, and with regard to the various motors mentioned above, it is noted that the speeds of the motors are also able to be controlled as needed based on the size of the stems.

The embodiments described above are applicable to the removal of any biomass from a stem, and can be used, for example, in the processing of freshly cut industrial hemp, partially dry industrial hemp and fully dry industrial hemp. However, the embodiments described above could also be used for defoliating or de-seeding many other types of crops or foliage.

In some embodiments, any of the biomass removal systems described above are sized so as to be capable of being loaded into a mobile unit and driven to different fields/use locations. In other embodiments, any of the above systems can also be part of a combine system as one component of a moving assembly.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for removing biomass from a stem, comprising:
   a frame having a plurality of leg members extending in a vertical direction, and transverse members connected to the leg members so as to be perpendicular to the leg members and extend in a length direction of the frame;
   a conveyor mechanism which moves the stem in a horizontal conveying direction from an inlet end of the conveyor mechanism to an outlet end of the conveyor mechanism, the conveyor mechanism being connected to an upper portion of the frame, wherein the conveyor mechanism includes:
      two support members, each support member including a plurality of rotational elements and having a length which extends in the length direction of the frame, the support members being arranged alongside each other so as to define a conveying path between mutually opposing lengthwise surfaces of the support members, wherein one of the support members is fixed to the frame as a fixed support member, and the other of the support members is pivotably mounted to the frame as a floating support member;
      two conveying layers, each conveying layer forming a loop around a respective one of the support members and being supported by the rotational elements of the respective one of the support members, wherein the conveying layers extend along the mutually opposing lengthwise surfaces of the support members, respectively; and
   a tensioning system attached to the frame, the tensioning system being arranged to exert a force which holds the stem to the conveyor mechanism, wherein the force exerted by the tensioning system is a biasing force which biases the floating support member towards the fixed support member;
   a first motor and a first transmission arranged above the conveyor mechanism and attached to the frame, the first motor and first transmission being arranged to drive the conveyor mechanism, wherein the first motor and the first transmission counter-rotate the conveying layers such that when the stem is placed in the inlet end of the conveyor mechanism, the stem is held between the conveying layers and moved along the conveying path;
a pair of rollers arranged to exert a rubbing force between each other for removing the biomass from the stem; and
a second motor and a second transmission supported by the frame, the second motor and second transmission being arranged to counter-rotate the pair of rollers wherein:
a first axial end of each roller is connected to an inlet end side of the conveyor mechanism and a second axial end of each roller is connected to the second transmission such that the rollers are angled downward from the first axial ends of the rollers at the inlet end side of the conveyor mechanism to the second axial ends of the rollers;
the first axial end of one of the rollers is connected to an inlet end side of the fixed support member, and the first axial end of the other of the rollers is connected to an inlet end side of the floating support member; and
the conveyor mechanism moves the stem so as to pass between the rollers such that the rubbing force of the rollers removes the biomass from the stem, and such that the rubbing force for removing the biomass moves downward along the stem as the stem moves in the conveying direction.

2. The system of claim 1, wherein each conveying layer is made of a sharp top roller chain.

3. The system of claim 2, wherein PTFE slides are arranged along the mutually opposing lengthwise surfaces of the support members, respectively.

4. The system of claim 1, further comprising a support structure,
wherein a first portion of the support structure is attached to the frame and has holes spaced apart from each other at a plurality of heights along the first portion of the support structure, and a second portion of the support structure has fasteners which are engageable with the holes, the second portion being adjustably coupled to the first portion by the fasteners being engaged with the holes at a selected one of the heights,
and wherein the second motor and the second transmission are attached to the second portion of the support structure such that a height of the second axial ends of the rollers is determined by the selected one of the heights at which the fasteners of the second portion of the support structure are engaged with the holes of the first portion of the support structure.

5. The system of claim 1, further comprising:
an arm connected to the second transmission and extending from the second transmission toward the pair of rollers; and
a protective roller arranged at an end of the arm and positioned above the pair of rollers so as to deflect the stem away from the second transmission.

6. A system for removing biomass from stems, comprising:
a frame having a plurality of leg members extending in a vertical direction, and transverse members connected to the leg members so as to be perpendicular to the leg members and extend in a length direction of the frame;
a conveyor mechanism which moves a first one of the stems along a first horizontal conveying path from an inlet end of the conveyor mechanism to an outlet end of the conveyor mechanism, and which moves a second one of the stems along a second horizontal conveying path from the inlet end of the conveyor mechanism to the outlet end of the conveyor mechanism, the conveyor mechanism being connected to an upper portion of the frame, wherein the conveyor mechanism includes:
first, second, third and fourth support members, each support member including a plurality of rotational elements and having a length which extends in the length direction of the frame, the support members being arranged alongside each other so as to define the first conveying path between mutually opposing lengthwise surfaces of the first and second support members, and so as to define the second conveying path between mutually opposing lengthwise surfaces of the third and fourth support members, wherein the second and third support members are parallel to each other and fixed to the frame as fixed support members, and the first and fourth support members are pivotably mounted to the frame as floating support members;
four conveying layers, each conveying layer forming a loop around a respective one of the support members and being supported by the rotational elements of the respective one of the support members, wherein the conveying layers extend along the mutually opposing lengthwise surfaces of the support members, respectively; and
a tensioning system attached to the frame, the tensioning system being arranged to exert a force which holds the stems to the conveyor mechanism wherein the force exerted by the tensioning system is a biasing force which biases the first support member towards the second support member, and which biases the fourth support member towards the third support member;
a first pair of rollers arranged to exert a rubbing force between each other for removing the biomass from the first one of the stems moved by the conveyor mechanism;
a second pair of rollers arranged to exert a rubbing force between each other for removing the biomass from the second one of the stems moved by the conveyor mechanism;
a first motor and a first transmission supported by the frame, the first motor and first transmission being arranged to counter-rotate the first pair of rollers;
a second motor and a second transmission supported by the frame, the second motor and second transmission being arranged to counter-rotate the second pair of rollers wherein:
a first axial end of each of the first pair of rollers is connected to an inlet end side of the conveyor mechanism and a second axial end of each of the first pair of rollers is connected to the first transmission such that the first pair of rollers are angled downward from the first axial ends of the first pair of rollers at the inlet end side of the conveyor mechanism to the second axial ends of the first pair of rollers;
the first axial end of one of the first pair of rollers is connected to an inlet end side of the second support member, and the first axial end of the other of the first pair of rollers is connected to an inlet end side of the first support member;
a first axial end of each of the second pair of rollers is connected to the inlet end side of the conveyor mechanism and a second axial end of each of the second pair of rollers is connected to the second transmission such that the second pair of rollers are angled downward from the first axial ends of the second pair of rollers at the inlet end side of the conveyor mechanism to the second axial ends of the second pair of rollers;

the first axial end of one of the second pair of rollers is connected to an inlet end side of the third support member, and the first axial end of the other of the second pair of rollers is connected to an inlet end side of the fourth support member;

the conveyor mechanism moves the first one of the stems so as to pass between the first pair of rollers such that the rubbing force of the first pair of rollers removes the biomass from the first one of the stems, and such that the rubbing force for removing the biomass moves downward along the first one of the stems as the first one of the stems moves along the first horizontal conveying path; and the conveyor mechanism moves the second one of the stems so as to pass between the second pair of rollers such that the rubbing force of the second pair of rollers removes the biomass from the second one of the stems, and such that the rubbing force for removing the biomass moves downward along the second one of the stems as the second one of the stems moves along the second horizontal conveying path;

a third motor and a third transmission arranged above the conveyor mechanism and attached to the frame, wherein the third motor and the third transmission counter-rotate the conveying layers supported by the first and second support members such that when the first one of the stems is placed in the inlet end of the conveyor mechanism, the first one of the stems is held between the conveying layers supported by the first and second support members and moved along the first conveying path; and a fourth motor and a fourth transmission arranged above the conveyor mechanism and attached to the frame, wherein the fourth motor and the fourth transmission counter-rotate the conveying layers supported by the third and fourth support members such that when the second one of the stems is placed in the inlet end of the conveyor mechanism, the second one of the stems is held between the conveying layers supported by the third and fourth support members and moved along the second conveying path.

7. A method comprising:
providing a stem to a conveyor mechanism, the stem having biomass attached thereto, wherein the conveyor mechanism includes:
   two support members arranged alongside each other so as to define a horizontal conveying path between mutually opposing lengthwise surfaces of the support members, each support member including a plurality of rotational elements, wherein one of the support members is fixed to a frame as a fixed support member, and the other of the support members is pivotably mounted to the frame as a floating support member; and
   two conveying layers, each conveying layer forming a loop around a respective one of the support members and being supported by the rotational elements of the respective one of the support members, wherein the conveying layers extend along the mutually opposing lengthwise surfaces of the support members, respectively;

moving the stem along the horizontal conveying path from an inlet end of the conveyor mechanism to an outlet end of the conveyor mechanism; and during the moving of the stem:
   applying a force to the conveyor mechanism so as to hold the stem to the conveyor mechanism, wherein the applying of the force to the conveyor mechanism comprises applying a biasing force to the floating support member which biases the floating support member towards the fixed support member,
   counter-rotating the conveying layers such that when the stem is provided to the conveyor mechanism, the stem is held between the conveying layers and moved along the horizontal conveying path,
   passing the stem and attached biomass between a pair of counter-rotating rollers arranged below the conveyor mechanism, the pair of rollers being angled downward from the inlet end of the conveyor mechanism to the outlet end of the conveyor mechanism,
   applying a rubbing force to the attached biomass so as to remove the biomass from the stem, and
   moving the rubbing force downward along the stem as the stem moves along the horizontal conveying path.

8. The method of claim 7, further comprising:
prior to the passing of the stem and attached biomass between the pair of counter-rotating rollers, selecting one of a plurality of heights for a lower end of the pair of rollers; and
securing the lower end of the pair of rollers at the selected one of the heights.

9. The method of claim 7, wherein the providing of the stem comprises providing a first stem and a second stem to the conveyor mechanism, each stem having biomass attached thereto,
   wherein the moving of the stem comprises moving the first stem along a first horizontal conveying path from the inlet end of the conveyor mechanism to the outlet end of the conveyor mechanism, and moving the second stem along a second horizontal conveying path from the inlet end to the outlet end,
   wherein the applying of the force to the conveyor mechanism comprises applying the force to the conveyor mechanism so as to hold the first and second stems to the conveyor mechanism,
   wherein the applying of the rubbing force comprises applying the rubbing force to the attached biomass so as to remove the biomass from the first and second stems, and
   wherein the moving of the rubbing force comprises moving the rubbing force downward along the first and second stems as the first and second stems move along the conveying paths.

10. The method of claim 9, wherein the applying of the rubbing force and the moving of the rubbing force downward along the first and second stems include
   passing the first stem and attached biomass between a first pair of counter-rotating rollers arranged below the conveyor mechanism, and
   passing the second stem and attached biomass between a second pair of counter-rotating rollers arranged below the conveyor mechanism, the first pair of rollers and the second pair of rollers each being angled downward from the inlet end of the conveyor mechanism to the outlet end of the conveyor mechanism.

11. The method of claim 10, wherein the conveyor mechanism comprises first, second, third and fourth support members, the support members being arranged alongside each other so as to define the first conveying path between mutually opposing lengthwise surfaces of the first and second support members, and so as to define the second conveying path between mutually opposing lengthwise surfaces of the third and fourth support members,
   wherein each support member includes a plurality of rotational elements,
   wherein the conveyor mechanism further comprises four conveying layers, each conveying layer forming a loop around a respective one of the support members and being supported by the rotational elements of the respective one of the support members,
   wherein the conveying layers extend along the mutually opposing lengthwise surfaces of the support members, respectively,
   and wherein the moving of the first and second stems comprises
      counter-rotating the conveying layers supported by the first and second support members such that when the first stem is provided to the conveyor mechanism, the first stem is held between the conveying layers supported by the first and second support members and moved along the first conveying path, and
      counter-rotating the conveying layers supported by the third and fourth support members such that when the second stem is provided to the conveyor mechanism, the second stem is held between the conveying layers supported by the third and fourth support members and moved along the second conveying path.

12. The method of claim 11, wherein the second and third support members are fixed to a frame as fixed support members, and the first and fourth support members are pivotably mounted to the frame as floating support members,
and wherein the applying of the force to the conveyor mechanism comprises applying a biasing force to the first support member which biases the first support member towards the second support member, and applying a biasing force to the fourth support member which biases the fourth support member towards the third support member.

13. A method comprising:
providing a stem to a conveyor mechanism, the stem having biomass attached thereto;
moving the stem along a horizontal conveying path from an inlet end of the conveyor mechanism to an outlet end of the conveyor mechanism; and
during the moving of the stem:
   applying a force to the conveyor mechanism so as to hold the stem to the conveyor mechanism,
   passing the stem and attached biomass between a pair of rollers arranged below the conveyor mechanism, the pair of rollers being angled downward from the inlet end of the conveyor mechanism to the outlet end of the conveyor mechanism,
   counter-rotating the pair of rollers with a motor and a transmission connected to a lower end of the pair of rollers;
   deflecting the stem away from the transmission with a protective roller arranged above the pair of rollers;
   applying a rubbing force to the attached biomass so as to remove the biomass from the stem, and
   moving the rubbing force downward along the stem as the stem moves along the conveying path.

* * * * *